United States Patent [19]

Camerano

[11] 4,338,920
[45] Jul. 13, 1982

[54] PLATE SOLAR-HEAT COLLECTOR

[76] Inventor: Angelo Camerano, 42/1A, Via Mignone, Savona, Italy

[21] Appl. No.: 139,394

[22] Filed: Apr. 11, 1980

[30] Foreign Application Priority Data

Apr. 24, 1979 [IT] Italy ................... 12560 A/79

[51] Int. Cl.³ ................................. F24J 3/02
[52] U.S. Cl. ...................... 126/443; 126/446; 126/450; 165/171; 165/183
[58] Field of Search ............... 126/448, 449, 450, 443, 126/446, 438; 165/178, 181

[56] References Cited

U.S. PATENT DOCUMENTS

| 2,566,327 | 9/1951  | Hallock      | 126/442 |
| 3,148,441 | 9/1964  | Schuler      | 165/181 |
| 3,916,871 | 11/1975 | Estes et al. | 126/450 |
| 3,983,861 | 10/1976 | Beauchaine   | 126/442 |
| 4,180,055 | 12/1979 | Hudnall      | 126/446 |
| 4,185,616 | 1/1980  | Johnson      | 126/444 |
| 4,204,521 | 5/1980  | Mattson      | 126/448 |

FOREIGN PATENT DOCUMENTS

| 2552102 | 5/1976  | Fed. Rep. of Germany . |         |
| 2617452 | 11/1976 | Fed. Rep. of Germany . |         |
| 2555015 | 6/1977  | Fed. Rep. of Germany . |         |
| 2739787 | 3/1979  | Fed. Rep. of Germany   | 126/449 |
| 2838883 | 4/1979  | Fed. Rep. of Germany   | 126/443 |

Primary Examiner—James C. Yeung
Attorney, Agent, or Firm—Berman, Aisenberg & Platt

[57] ABSTRACT

The solar collector comprises a plurality of chambers connected to one another through interconnecting ducts, said chambers being defined, on the upper side of the collector, that is the side facing to the sun—by transparent outwardly- convex surfaces, hile the pipes of the piping system enclosed within the housing extend through the chambers and the interconnecting ducts.

On the lower side of the collector, the chambers and interconnecting ducts are defined by inwardly-reflecting surfaces which have an outwardly-convex configuration.

3 Claims, 6 Drawing Figures

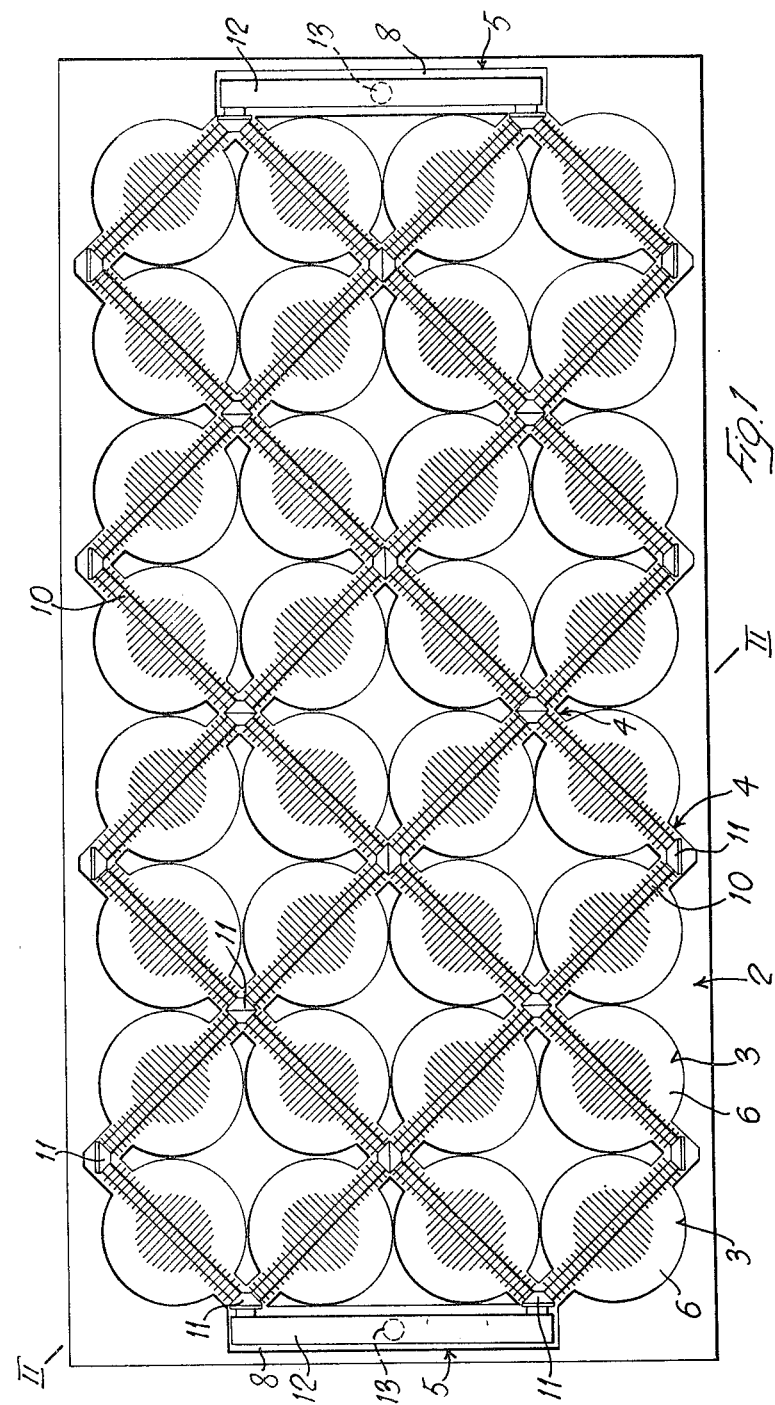

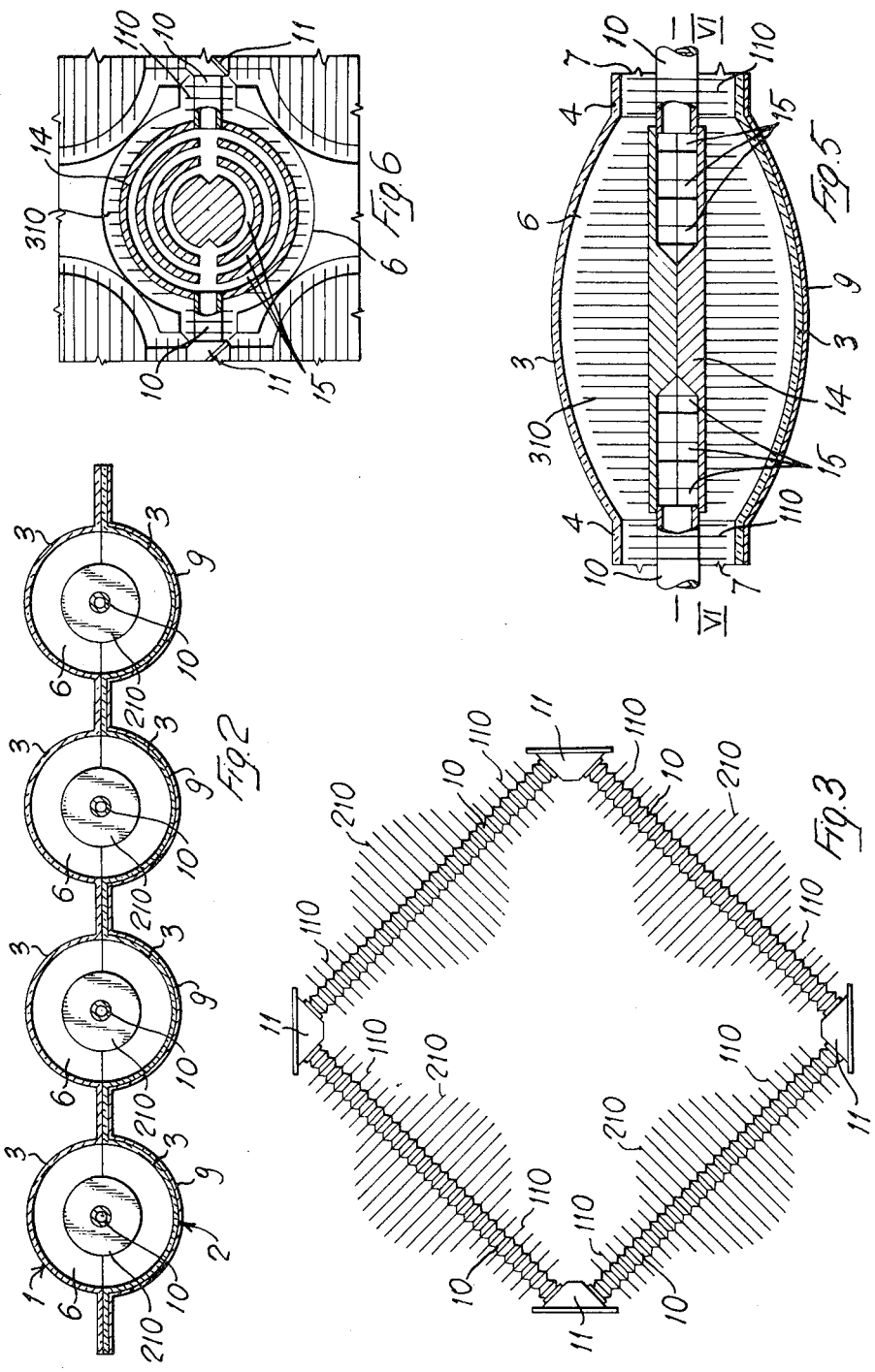

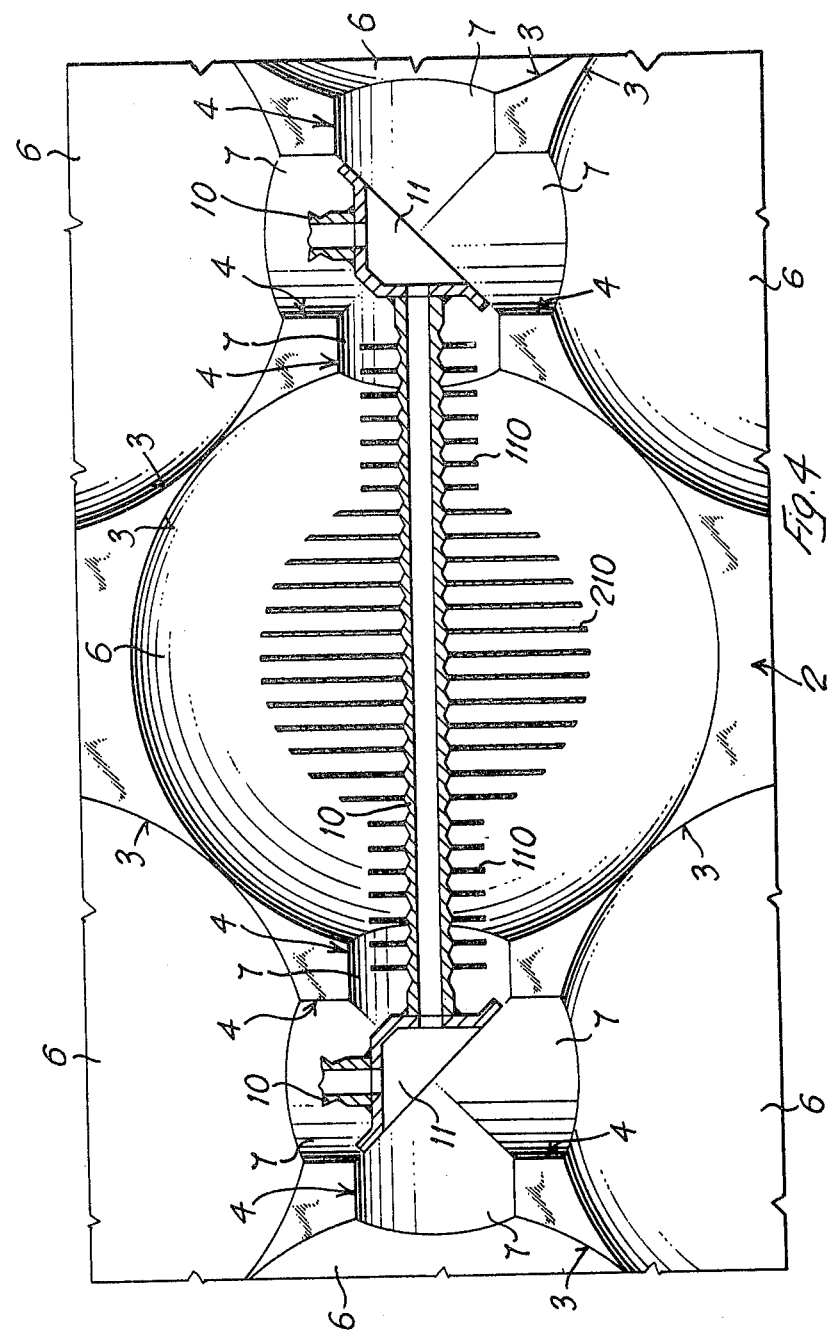

4,338,920

PLATE SOLAR-HEAT COLLECTOR

SUMMARY OF THE INVENTION

This invention relates to a plate solar-heat collector, that is a plate member or panel which is exposed to the sun and is provided with an assembly of conduits wherethrough a liquid is passed while being heated by solar energy.

The object of the invention is to provide a plate solar heat collector of the above-specified type (also called briefly "solar collector") which has a greater collecting capacity for solar energy and, particularly, which can collect a substantially constant amount of solar energy without necessity to be continuously displaced and indexed towards the sun.

This object is achieved by the present invention by means of a solar collector of the above-specified type, characterized in that it comprises a piping system for the liquid to be heated, said piping system being made of a good thermal conductor, usually of metal, so designed as to collect the maximum possible amount of solar radiation, and sealingly enclosed within a housing the upper portion of which—facing to the sun—is made of transparent material, and the lower opposite portion of which is made of an inwardly-reflecting material. Vacuum is created and maintained in said housing. Any contact of the housing with the internal piping system must be either completely avoided or extremely limited. The material forming the housing must have, whenever possible, good insulating characteristics, at least in the lower portion thereof, whilst the upper portion of the housing is preferably either of plastic or of glass.

According to a preferred emboidment, the solar collector according to the invention comprises a plurality of chambers connected to one another through interconnecting ducts, said chambers being defined—at least on the upper side of the collector, that is the side facing to the sun—by transparent outwardly-convex surfaces, while the pipes of the piping system enclosed within the housing extend through the chambers and the interconnecting ducts.

On the lower side of the collector, said chambers and/or interconnecting ducts are preferably defined by inwardly-reflecting surfaces which can be either of flat or outwardly-convex configuration. According to a preferred embodiment of the invention, said solar collector comprises a plurality of spheroidal chambers, so-called "bubbles", interconnected through a system of cylindrical ducts. According to another feature of the invention, said solar collector is formed by two mating portions of plastic material placed on each other and sealingly interconnected (glued or welded together) at their periphery and at the regions between adjacent chambers and ducts.

The upper half of the collector is made of transparent plastic and has outwardly-directed bulges, for example of substantially semi-spheroidal shape, one at each chamber in the collector, and outwardly-directed bulges, for example of substantially semi-cylindrical shape, one at each duct in the collector. The lower half of the collector is made of plastic material which is constructed with inwardly-reflecting capacity and can be either of flat shape or, preferably, of similar of identical shape as the upper half, that is provided with outwardly directed bulges, for example of substantially semi-spheroidal shape, one at each chamber in the collector, and with outwardly directed bulges, for example of substantially semi-cylindrical shape, one at each duct in the collector.

The piping system within the collector is preferably of metal, particularly aluminum. The pipes and/or fins thereof are preferably blackened. The peripheral edges of these fins are preferably located on an imaginary substantially cylindrical surface at the ducts of the collector and on an imaginary substantially spherical or similar surface at the chambers of the collector.

BRIEF DESCRIPTION OF THE DRAWINGS

These and other features of the invention and the advantages resulting therefrom will be apparent from the following description of a preferred embodiment thereof, shown as a non-limiting example in the accompanying drawings, wherein:

FIG. 1 is a plan view of a plate solar heat collector according to the invention;

FIG. 2 is a sectional view on line II—II of FIG. 1;

FIG. 3 shows one modular element of the internal piping system of the collector;

FIG. 4 is a sectional view of a portion of the internal piping system of the collector.

FIG. 5 is a cross section of a collector chamber of another embodiment of the invention.

FIG. 6 is a section along lines VI—VI of FIG. 5.

DESCRIPTION OF THE PREFERRED EMBODIMENT

With reference to the Figures, the plate solar heat collector panel is formed by two superimposed mating halves 1 and 2, each of which has external dome-shaped bulges 3, of substantially semi-spheroidal or semispherical configuration, interconnected by external tubular channel bulges 4 of substantially semi-cylindrical configuration. Said halves 1 and 2 also have, at two opposite sides, two bulges 5 of substantially semi-cylindrical shape which are connected through tubular bulges 4 to said assembly of bulges 3 and channel bulges 4.

Said halves 1 and 2 are identical to each other and, therefore, when they will be superimposed to each other, said dome-shaped bulges 3 will form together corresponding chambers 6 of substantially spherical shape, that is having outwardly-convex walls, while said tubular channel bulges 4 will form together substantially cylindrical ducts 7 interconnecting said chambers 6 with one another and with the tubular chambers 8 formed at two opposite sides of the collector by the coupled semi-cylindrical bulges 5.

At least the upper half 1 of the collector, which is facing to the sun, is made of transparent and preferably heat-insulating material, usually any suitable plastic material, and particularly transparent acrylic resin. The lower half 2 of the collector, however, can be made of any suitable material, preferably any heat-insulating material, presenting an inwardly reflecting capability. Usually, the lower half 2 is also of plastic material, preferably acrylic resin, which is given inwardly-reflecting capability by means of a suitable outer coating 9, such as by metallization.

The two superimposed halves 1, 2 of the collector are sealingly connected to each other at their peripheries and at the regions around said chambers 6, 8 and ducts 7, so as to form a sealed housing wherein vacuum is created and which encloses a piping system formed by a network of pipes 10 crossing with one another and inter-communicating at said cross-points. Preferably, this piping system is formed by modular elements of the type shown in FIG. 3. Each modular element is constituted by four pipes 10 forming together a square, rectangular or other polygonal configuration and interconnected at the angles of the polygon through adaptors 11 which also connect all modular elements to one another. At the two sides of the collector panel facing said tubular chambers 8, said modular elements are connected through adaptors 11 to a manifold pipe 12 located in the respective chamber 8 and provided with a connector 13 sealingly projecting out of said chamber 8. At the other two opposite sides of the collector panel, said adapters 11 are sealingly closed by means of suitable covers.

The piping system comprises metallic pipes 10, particularly of aluminum, provided with external fins 110, 210. Preferably, the outer surface of the pipe 10 is either corrugated or grooved between said fins, 110, 210 as shown in FIG. 4. The outer surfaces of said pipes and-/or their fins 110, 210 and/or said adapters 11 are preferably blackened. The pipes 10 of the piping system extend diametrically through said chambers 6 and coaxially through said ducts 7, while said adapters 11 are at the crossing-points of said ducts 7. The outer edges of the fins 110 in the ducts lie on a cylindrical imaginary surface, and the outer edges of the fins 210 in the chambers 6 lie on a spherical or spheroidal imaginary surface. The fins 210 do not contact the walls of the respective chambers 6. Any contact of the fins 110 with the walls of the ducts 7 is also avoided or minimized. This also applies to said adapters 11.

The plate solar heat collector described above, therefore, comprises a system of metallic finned pipes 10, blackened to enhance their absorption capacity of solar radiation, said piping system being enclosed within a housing 1, 2 comprising a transparent surface on the side facing towards the sun, and an inwardly-reflecting surface on the opposite side; said housing 1, 2 is defined by a plurality of outwardly-convex walls 3, 4 on the side facing to the sun, and vacuum is created therein. Therefore, and especially by virtue of said convex walls 3 and 4, the solar heat collector according to the invention collects solar radiation in a substantially uniform way regardless of its orientation with no need to move the collector to index it always towards the sun. Therefore, with such a stationary solar collector, a constant concentration of solar energy is obtained at all times. At the same time, the maximum exploitation of the collected solar energy is assured, because the piping system 10—while absorbing solar radiation at a maximum rate and thus strongly heating the liquid circulating therein—is thermally insulated from the surrounding atmosphere due to vacuum in said housing 1, 2, which prevents convection dissipation of heat. By virtue of said lower reflecting surfaces 9, the collector according to the invention will also collect the diffused solar radiation and concentrate it on the internal piping system. The fin assemblies 110, 210 on the pipes and the corrugated surface of said pipes, will collect infrared radiation.

The embodiment shown in FIGS. 5 and 6 corresponds substantially to the embodiment just described with reference to FIGS. 1 to 4, so that the same reference numerals have been used to identify substantially identical parts. The collector chamber 6 of the housing, and more precisely the bulges 3 obtained in the halves 1, 2 are shaped like a flat dome, in a lenticular manner. The piping enclosed in the said halves 1, 2, presents, in correspondence of each one of the collector chambers 6 a portion 14 resembling a circular disc, and is provided with a plurality of concentric annular flow channels 15 connected between each other and with the pipes 10. Fins 310 are provided on the flat sides of the said disc. The anular flow channels 15 are arranged in such a manner that at the interior of the collector chamber 6 there is provided a flow section which is greater with respect to the flow section of pipes 10, and therefore there is obtained a lower speed of the flow of the liquid circulating in the said chambers.

I claim:

1. A solar-radiation collector comprising:
   (a) a plurality of elongated pipe means capable of absorbing solar radiation, for transporting a medium to be heated,
   (b) said plurality of pipe means being arranged in a generally planar array,
   (c) fins for absorbing solar radiation, on each of said plurality of pipe means and tranverse to each of said plurality of pipe means,
   (d) an evacuated and at least partially transparent chamber surrounding said pipe means and said fin means,
   (e) a transparent element having a plurality of partially-cylindrical and a plurality of partially-spherical bulges, each partially-cylindrical bulge being coaxial with a partially spherical bulge,
   (f) a reflective element having a plurality of partially-cylindrical and partially-spherical bulges, each partially-cylindrical bulge being coaxial with a partially-spherical bulge,
   (g) said transparent and said reflective elements being joined together to form said evacuated chamber, said evacuated chamber having co-axial cylindrical and spherical portion, and
   (h) the perimeters of some of said fins lying in an imaginary cylindrical surface located within said cylindrical portion, and the perimeters of other of said fins lying in an imaginary spherical surface located within said spherical portion.

2. The solar-radiation collector of claim 1, further comprising:
   (i) a plurality of adaptor means each connected to at least one end of each of said plurality of elongated pipe means, for connecting each of said pipe means to other pipe means, and
   (j) wherein said plurality of elongated pipe means are arranged in a parallelogram.

3. The solar-collector of claim 1 wherein:
   (i) said elongated pipe means includes a flat disc-like portion with annular interior flow ducts for reducing the flow velocity of said medium through said disc-like portion,
   (j) some of said fins being located on the flat surfaces of said disc-like portion.

* * * * *